(12) United States Patent
Buck

(10) Patent No.: US 9,488,033 B2
(45) Date of Patent: Nov. 8, 2016

(54) VALVE WITH STOP MECHANISM

(71) Applicant: David A. Buck, Arnaudville, LA (US)

(72) Inventor: David A. Buck, Arnaudville, LA (US)

( * ) Notice: Subject to any disclaimer, the term of this patent is extended or adjusted under 35 U.S.C. 154(b) by 0 days.

(21) Appl. No.: 14/507,578

(22) Filed: Oct. 6, 2014

(65) Prior Publication Data

US 2015/0090917 A1    Apr. 2, 2015

Related U.S. Application Data

(63) Continuation-in-part of application No. 14/252,942, filed on Apr. 15, 2014, which is a continuation-in-part of application No. 13/960,497, filed on Aug. 6, 2013, which is a continuation-in-part of application No. 13/863,918, filed on Apr. 16, 2013, now Pat. No. 8,998,173, application No. 14/507,578, which is a continuation-in-part of application No. 14/252,942.

(60) Provisional application No. 61/924,316, filed on Jan. 7, 2014.

(51) Int. Cl.
| | |
|---|---|
| E21B 34/06 | (2006.01) |
| E21B 34/14 | (2006.01) |
| E21B 34/00 | (2006.01) |
| F16K 5/06 | (2006.01) |
| F16K 5/20 | (2006.01) |
| F16K 27/06 | (2006.01) |

(52) U.S. Cl.
CPC .............. *E21B 34/06* (2013.01); *E21B 34/14* (2013.01); *F16K 5/0626* (2013.01); *F16K 5/0689* (2013.01); *F16K 5/201* (2013.01); *F16K 27/067* (2013.01); *E21B 2034/002* (2013.01)

(58) Field of Classification Search
CPC .. E21B 34/14; E21B 2034/002; F16K 5/201; F16K 5/0689; F16K 5/0626; F16K 5/0631; F16K 5/205; F16K 5/208; F16K 27/067; Y10T 137/6011; Y10T 137/6038; Y10T 137/6041; Y10T 137/0402; Y10T 137/0441; Y10T 137/0447; Y10T 137/0486; Y10T 137/0508

USPC .................. 251/315.01, 314, 217.01, 315.08, 251/315.1, 315.13, 315.11, 357, 359–365; 166/330, 332.3; 137/315.18, 315.19, 137/315.2, 15.01, 15.08, 15.09, 15.17, 137/15.18, 15.22

See application file for complete search history.

(56) References Cited

U.S. PATENT DOCUMENTS

| | | |
|---|---|---|
| 3,346,002 A | 10/1967 | Thompson, Jr. et al. |
| 4,023,773 A | 5/1977 | Wise |

(Continued)

FOREIGN PATENT DOCUMENTS

| | | |
|---|---|---|
| GB | 2472200 A | 2/2011 |

OTHER PUBLICATIONS

PCT Application No. US2014/060877; International Search Report and Written Opinion of the International Searching Authority for Applicant David A. Buck dated Feb. 4, 2015.

(Continued)

*Primary Examiner* — Michael R Reid
(74) *Attorney, Agent, or Firm* — Jones Walker LLP

(57) ABSTRACT

In the specification and drawings, a valve is described and shown having a first and second valve seat carrier, a valve seat associated with each valve seat carrier, and a valve ball between the valve seats. The valve further includes a stop mechanism operatively connected to at least a first valve seat, the stop mechanism limiting travel of the first valve seat towards the valve ball such that the valve ball may be push away from a sealing engagement with the first valve seat.

18 Claims, 21 Drawing Sheets

(56) References Cited

U.S. PATENT DOCUMENTS

| | | |
|---|---|---|
| 4,111,393 A | 9/1978 | McClurg et al. |
| 4,210,207 A | 7/1980 | McStravick et al. |
| 4,576,234 A | 3/1986 | Upchurch |
| 4,587,990 A * | 5/1986 | Pennell ................ F16K 5/0636 137/454.2 |
| 4,684,105 A * | 8/1987 | Haas, II ................ F16K 5/0626 251/150 |
| 5,117,858 A | 6/1992 | Osthues et al. |
| 5,246,203 A | 9/1993 | McKnight et al. |
| 5,377,954 A | 1/1995 | Adams et al. |
| 5,529,285 A | 6/1996 | McKnight et al. |
| 5,628,493 A | 5/1997 | McKnight et al. |
| 5,634,626 A | 6/1997 | Hartman |
| 5,738,336 A | 4/1998 | McKnight et al. |
| 6,019,129 A | 2/2000 | Taha |
| 2007/0007483 A1 | 1/2007 | Leblanc et al. |
| 2009/0095931 A1 | 4/2009 | Stunkard |
| 2010/0090146 A1 | 4/2010 | Keeper et al. |
| 2011/0133109 A1 | 6/2011 | Mircea |
| 2014/0306138 A1 | 10/2014 | Buck |

OTHER PUBLICATIONS

PCT Application No. US2014/033847; International Search Report and Written Opinion of the International Searching Authority for Applicant David A. Buck dated Apr. 2, 2015.

* cited by examiner

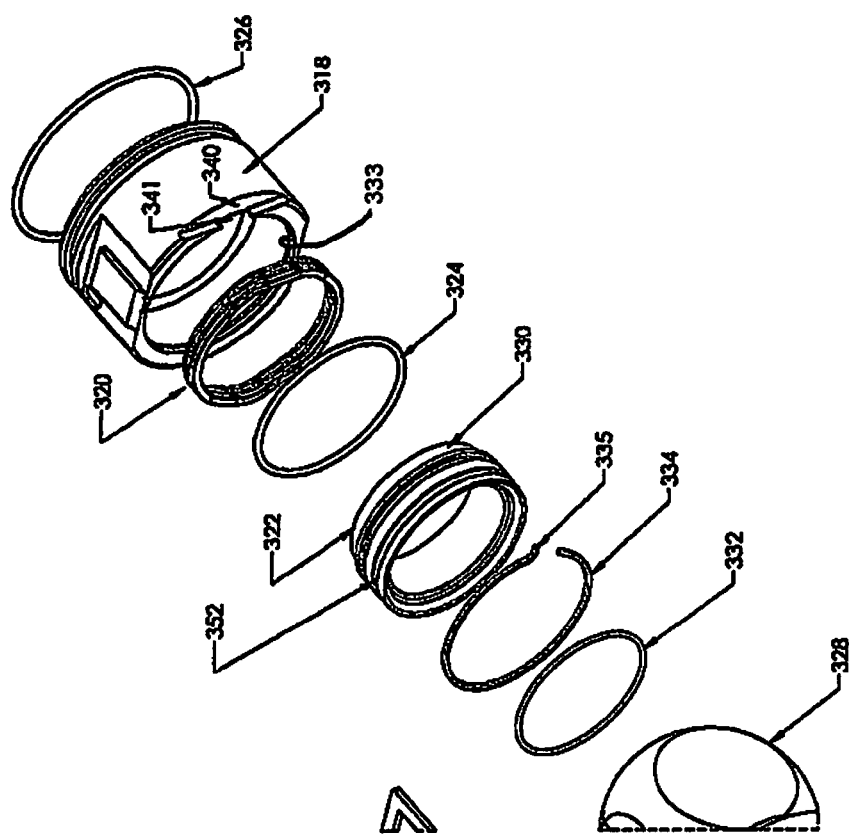

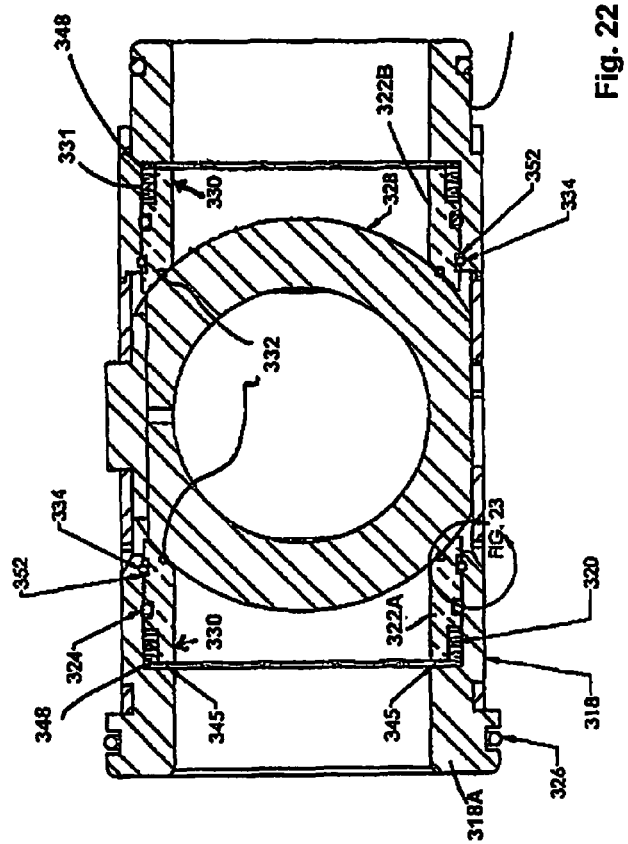
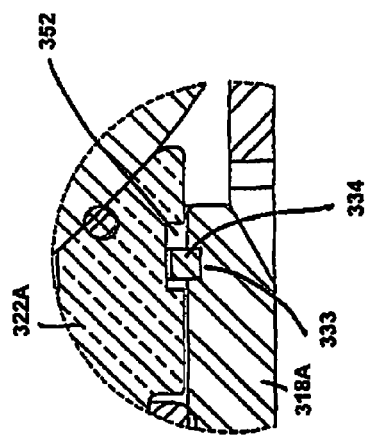

VALVE WITH STOP MECHANISM

CROSS REFERENCE TO RELATED APPLICATIONS

This application is a continuation-in-part of application Ser. No. 14/252,942, filed on Apr. 15, 2014, which is a continuation-in-part of application Ser. No. 13/960,497, filed Aug. 6, 2013, which is a continuation-in-part of application Ser. No. 13/863,918, filed on Apr. 16, 2013; and this application is a continuation-in-part of application Ser. No. 14/252,942, filed on Apr. 15, 2014, which claims the benefit under 35 U.S.C 119(e) of application Ser. No. 61/924,316 filed Jan. 7, 2014, all of which are incorporated by reference herein in their entirety.

BACKGROUND OF THE INVENTION

In many examples of drilling for oil or gas wells with standard U.S. technology, a drive bushing is turned by a rotary table. The drive bushing has a square or hexagonal passage therethrough slidably receiving a long square or hexagonal member known as a kelly. One potential hazard in drilling for oil or gas is encountering pressures which are not balanced by drilling fluid in the hole. One of many safety devices are valves on the kelly, on the lower end immediately above the uppermost drill pipe joint and on the upper end between the kelly and the swivel. The idea is to actuate the blowout preventer to seal around the outside of the drill string and to close the kelly valve or valves to keep well fluids from returning through the drill string. An analogous valve, known as a safety valve, is used in analogous situations in completion and workover operations.

SUMMARY OF SELECTED EMBODIMENTS OF THE INVENTION

One embodiment is a valve comprising first and second valve seat carriers, a valve seat associated with each of the valve seat carriers, and a valve ball positioned between the valve seats. A stop mechanism operates between the valve seat carriers and the valve seats, the stop mechanism allowing limited movement between the valve seat carriers and the valve seats, and a biasing mechanism biasing each valve seat toward the valve ball.

Another embodiment comprises a first and second valve seat carrier, a valve seat associated with each valve seat carrier, and a valve ball between the valve seats. A stop mechanism operatively connects to at least the first valve seat, the stop mechanism limiting travel of the first valve seat towards the valve ball such that the valve ball may be pushed away from a sealing engagement with the first valve seat. As a variation of this embodiment, the stop mechanism is operatively connected to both the first valve seat and the second valve seat.

Another embodiment comprises a first and second valve seat carrier, a valve seat associated with each valve seat carrier, and a valve ball between the valve seats. A stop mechanism includes a tongue with a lip, whereby the stop mechanism limits travel of the first valve seat towards the valve ball such that the valve ball may be pushed away from a sealing engagement with the first valve seat. In a variation of this embodiment, the tongue is positioned on the first valve seat and the lip engages a groove on the first valve seat carrier.

Another embodiment comprises a first and second valve seat carrier, a valve seat associated with each valve seat carrier, and a valve ball between the valve seats. The embodiment includes a means for limiting travel of the first valve seat towards the valve ball such that the valve ball may be pushed away from a sealing engagement with the first valve seat.

Another embodiment comprises a first valve seat carrier, first and second valve seats, and a valve ball between the valve seats. A stop mechanism is operatively connected between the a first valve seat and the first valve seat carrier, the stop mechanism limiting travel of the first valve seat towards the valve ball such that the valve ball may be pushed away from a sealing engagement with the first valve seat.

BRIEF DESCRIPTION OF THE SEVERAL VIEWS OF THE DRAWINGS

FIG. 21 is an exploded partial view of another alternative embodiment of the valve (or valve cartridge) described herein.

FIG. 22 is a cross-sectional view of the entire assembled valve suggested in FIG. 21.

FIG. 23 is a detail inset view from FIG. 22.

DETAILED DESCRIPTION

Figure 1:
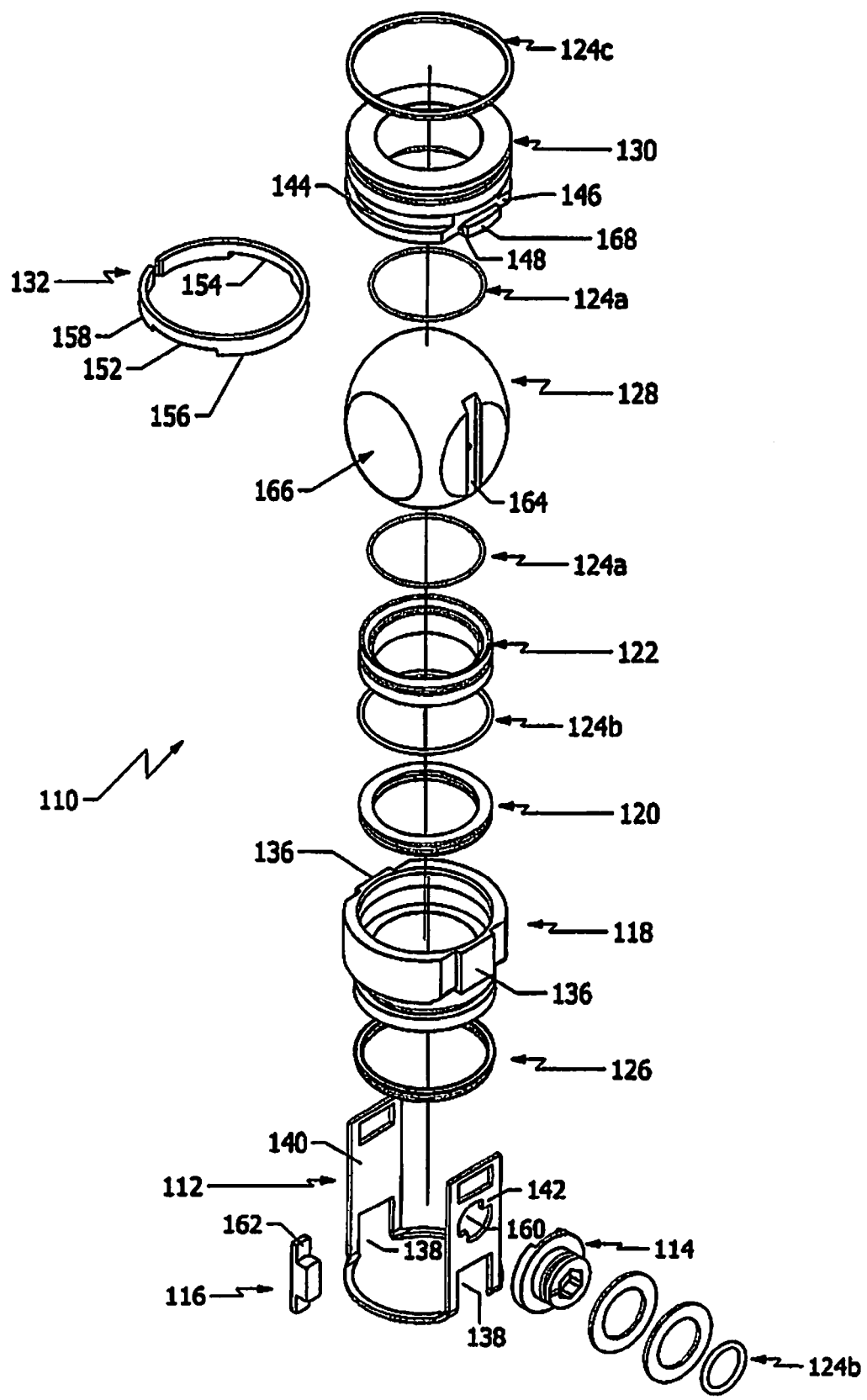
FIG. 1 is an exploded perspective view of an embodiment described herein.

As required, detailed embodiments of the present invention are disclosed herein. However, it is to be understood that the disclosed embodiments are merely exemplary of the invention, which can be embodied in various forms. As such, any feature(s) used in one embodiment can be used in another embodiment. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The terms "connected" and/or "coupled," as used herein, are defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 2:
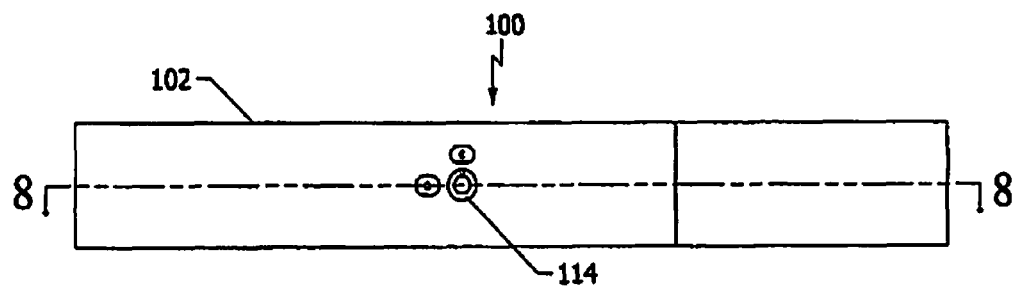
FIG. 2 is a side elevation view of an embodiment described herein.
Figure 3:
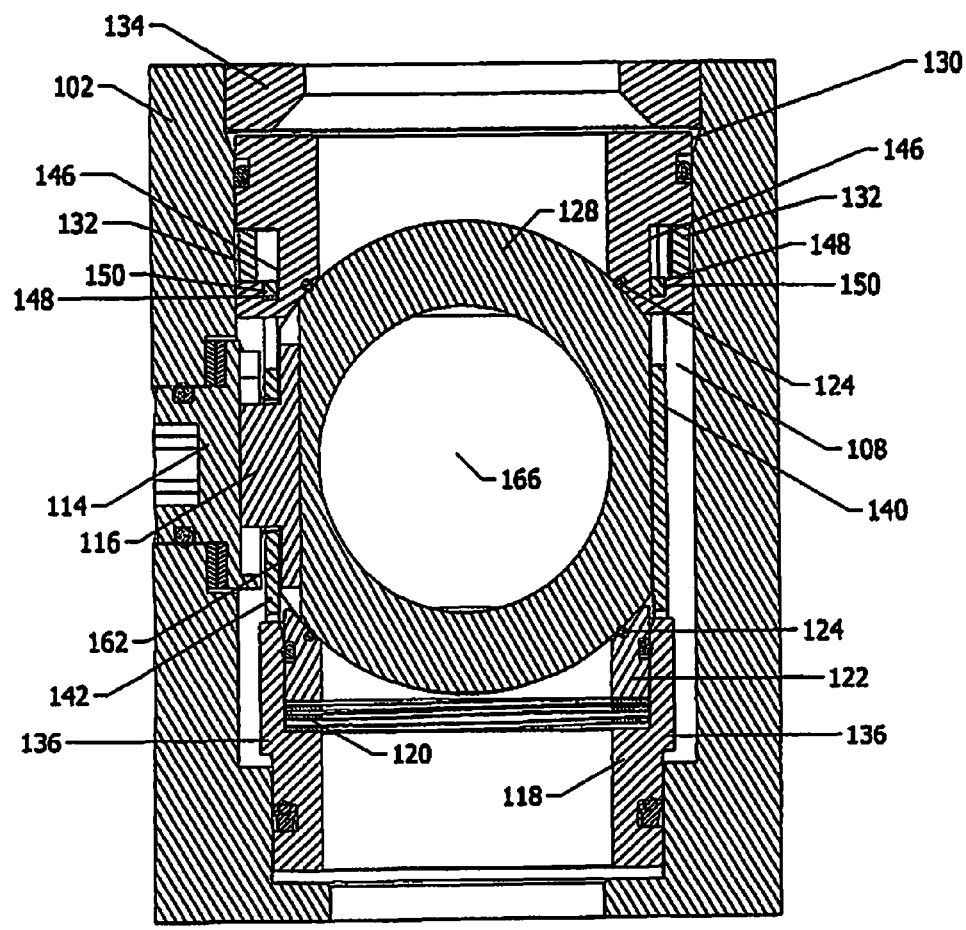
FIG. 3 is a sectional view of an embodiment described herein.
Figure 4:
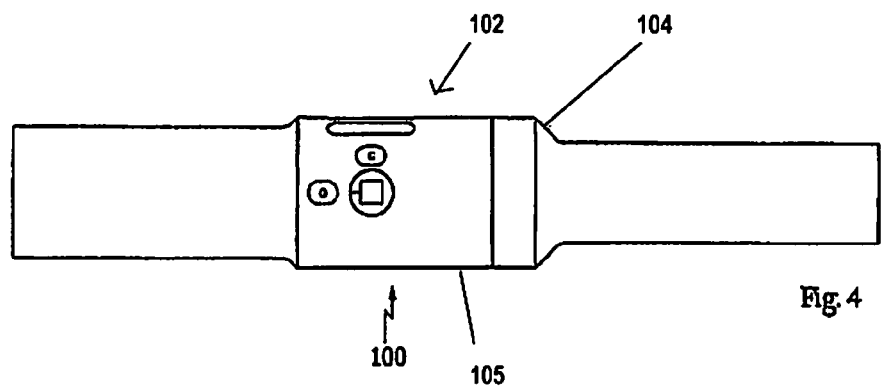
FIG. 4 is a side elevation view of an embodiment described herein.

Described now are exemplary embodiments. Referring to the drawings, beginning with FIGS. 1 to 3, an exemplary embodiment of a valve 100 is shown. The valve can be employed as a kelly valve, a safety valve, or any other application where a cartridge type valve or ball valve is employed. The valve 100 (FIG. 2) includes a housing 102 with a threaded drill pipe pin 104 at the lower end and a threaded drill pipe box 106 at the upper end. In one embodiment, the housing 102 can be constructed of one piece, two pieces, or a plurality of pieces. As shown in FIG. 3, the valve housing 102 has a cavity 108 therein which can contain a valve mechanism 110.

Referring to FIGS. 1, in this embodiment of valve mechanism 110 includes a bracket 112, an actuator or valve stem 114, an actuator key 116, a lower valve seat cartridge 118 (sometimes also referred to as a "valve seat carrier"), a spring 120, a lower valve seat 122, seals 124 and 126, a valve ball 128, an upper valve seat 130, and a ring 132. In the embodiment of FIG. 1, seals 124a are teflon rings, seals 124b rubber o-rings, seals 124c parbak o-rings, and seal 126 a poly-pak ring. Naturally, these seals are merely one example of the many different combinations of seals which could be employed.

Figure 8:
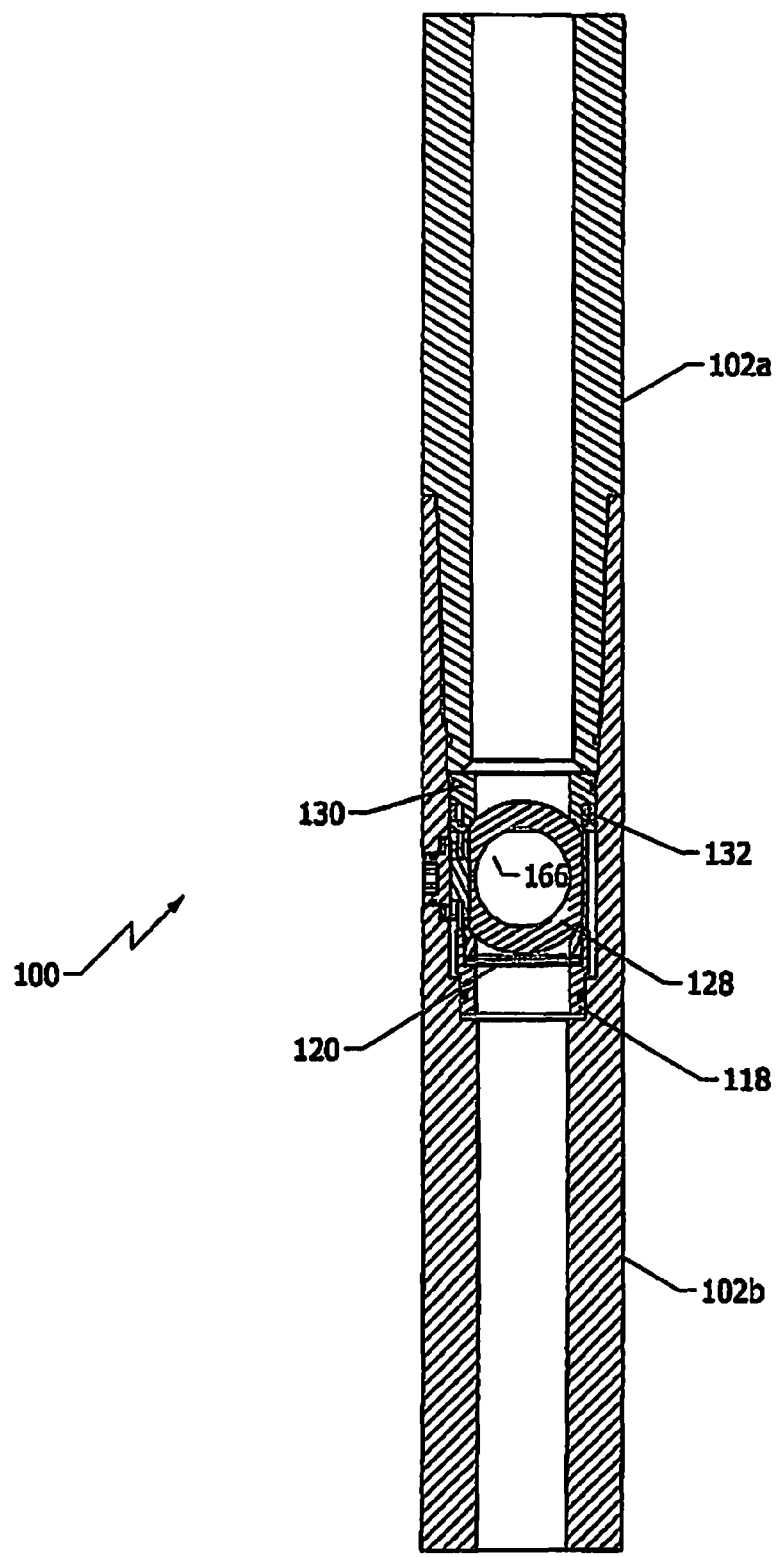
FIG. 8 is a section view of one valve embodiment within a sub housing.
Figure 9:
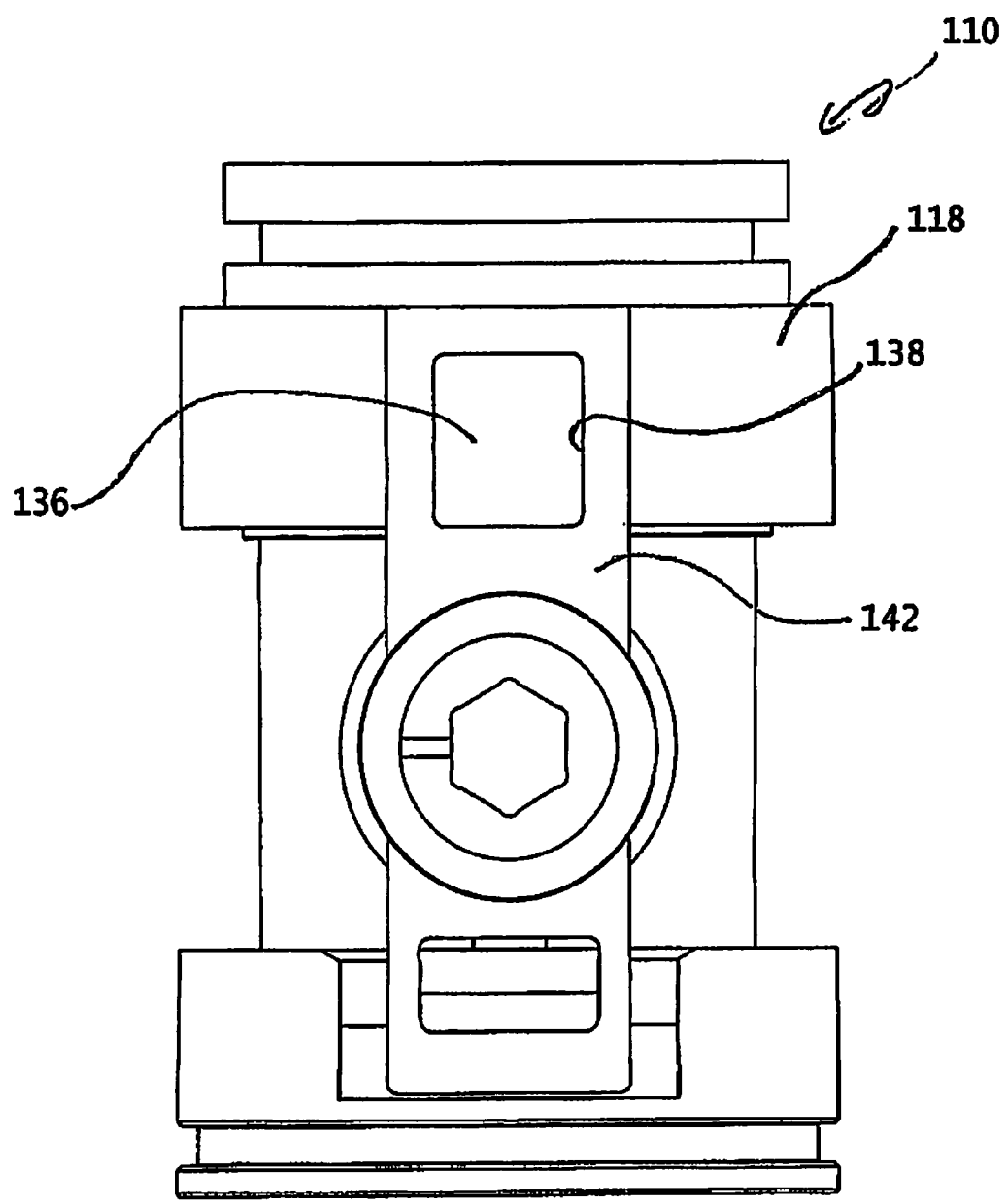
FIG. 9 is a side elevation view of an embodiment described herein.
Figure 10:
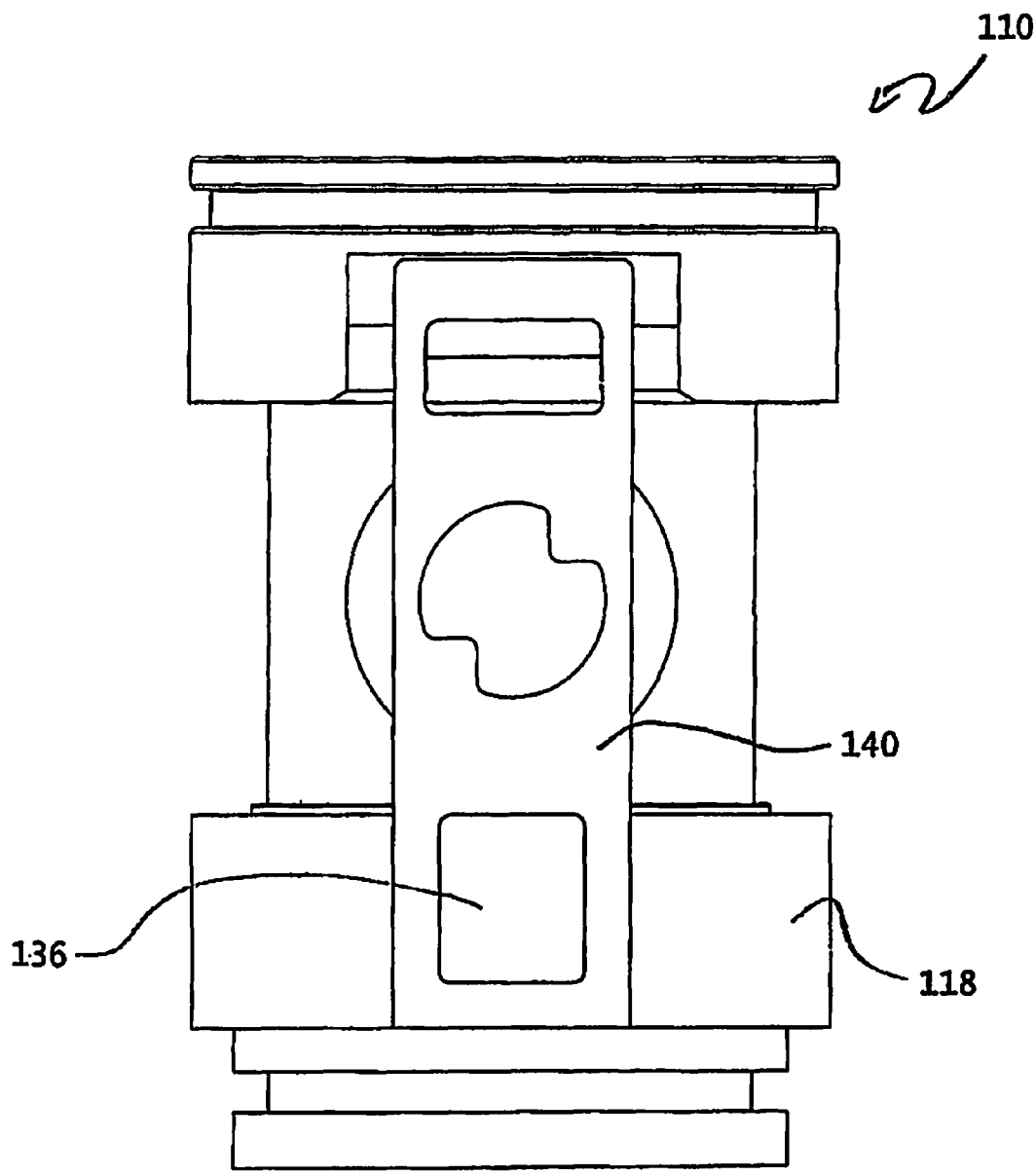
FIG. 10 is a side elevation view of an embodiment described herein.
Figure 11:
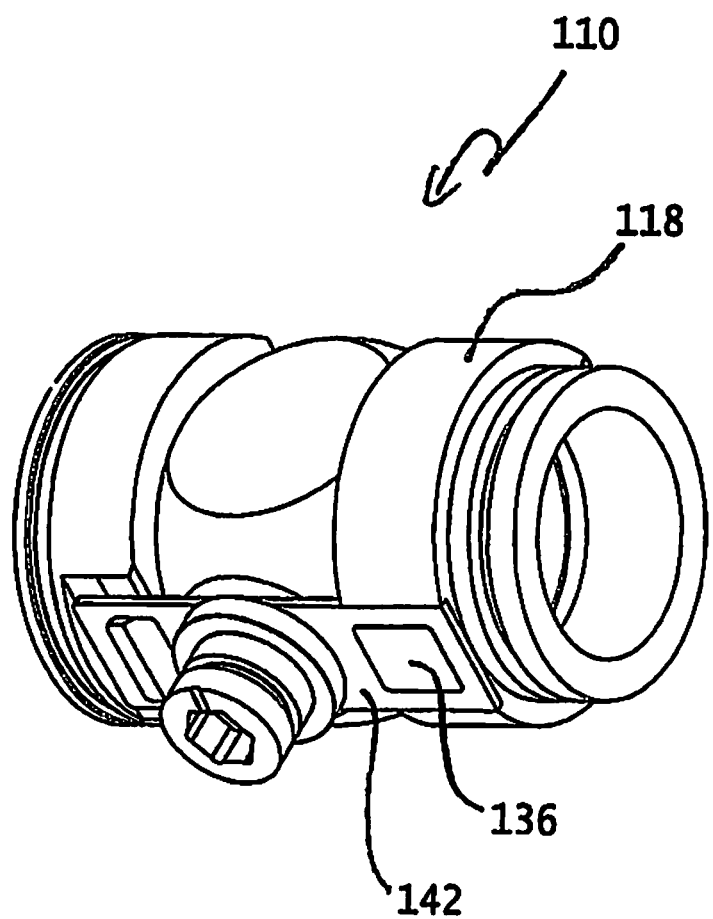
FIG. 11 is a perspective view of an embodiment described herein.
Figure 12:
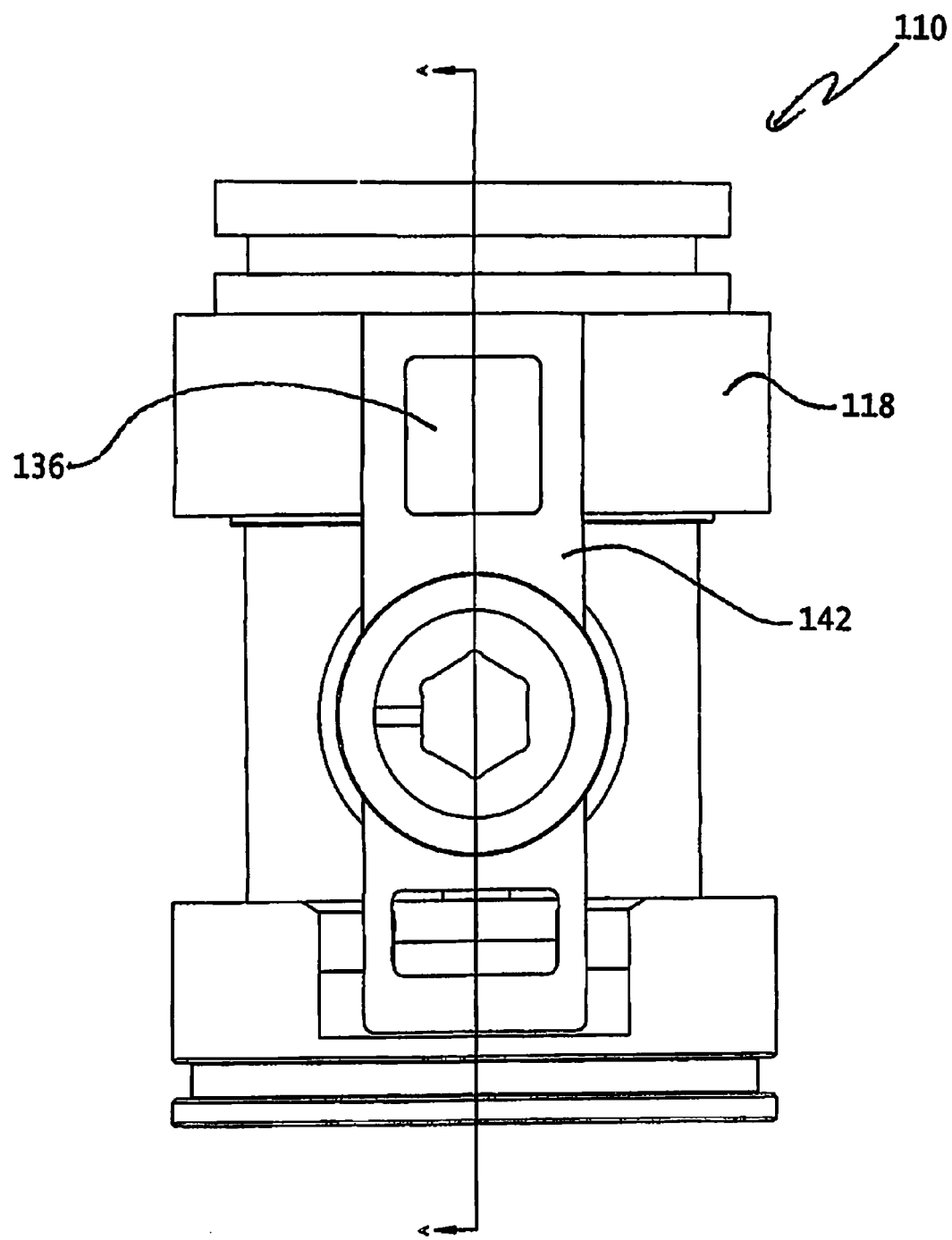
FIG. 12 is a side elevation view of an embodiment described herein.

The valve mechanism 110 can be secured within the housing 102 with cap 134 (FIG. 3). In one embodiment illustrated in FIG. 8, cap 134 may be formed by upper sub housing member 102a which threads into lower sub housing member 102b. Upper sub housing member 102a presses against upper valve seat 130 to secure it in place within lower sub housing member 102b. In an alternative embodiment not illustrated, the cap 134 may be an element separate from the upper sub housing and includes threads which mate with complementary threads on the inner wall of the housing 102, thereby allowing the cap 134 to be screwed into the housing 102 in order to secure the valve mechanism 110 within the housing 102. The valve mechanism 110 can be removed from the housing 102, for example in order to replace the valve mechanism 110 or to perform maintenance on the valve mechanism 110 (e.g., replace seals), by unscrewing the cap 134 and removing the valve mechanism 110 from the housing 102.

In this embodiment, when the valve mechanism 110 is in an assembled state, the lower valve seat cartridge 118 is seated against the lower portion of the bracket 112. The lower valve seat cartridge 118 can have one or more protrusions 136 which engage one or more corresponding slots 138 formed in a first tongue 140 and a second tongue 142 of the bracket 112, thereby securing the lower valve seat cartridge 118 to the bracket 112. All of the bracket 112 or portions of the bracket 112 (such as the first tongue 140 and the second tongue 142) can be constructed of a high strength, flexible material, such as a comparatively thin steel sheeting, including spring steel. In one example, the flexible material has a thickness ranging between about $50/1000$ of an inch and about $3/8$ of an inch, or any sub-range there between, although certain embodiments could be outside this range depending on the material used. In one preferred embodiment, bracket 112 is formed of spring steel about $100/1000$ of an inch thick. In certain preferred embodiments, bracket 112 is formed by water jetting or laser cutting the steel sheeting. Certain embodiments of bracket 112 are intended to be flexible by hand. In other words, the tongues 140 and 142 may be flexed apart sufficiently to allow the valve to be assembled and disassembled as described below. One example of being flexible by hand is flexing under about 10 lbs to 100 lbs force (or any sub-range there between) applied to the tongues 140 and 142.

The spring 120 is seated against the lower valve seat cartridge 118. The spring 120 can be a wave spring, a coiled spring, or any other type of spring or force exerting device (whether conventional or future developed). The lower valve seat 122 is positioned against spring 120 and valve ball 128 is seated against the lower valve seat 122. Upper valve seat 130 is engaged with first tongue 140 and the second tongue 142 of the bracket (as is further described below), and the upper valve seat 130 is positioned against the valve ball 128. Seal 1249, such as a Teflon® O-ring, is positioned between the lower valve seat 122 and the valve ball 128, and seals against the passage of fluid between the lower valve seat 122 and the outer surface of the valve ball 128. Similarly, seal 124a, such as a Teflon® O-ring, is positioned between the upper valve seat 130 and the valve ball 128, and seals against the passage of fluid between the upper valve seat 130 and the outer surface of the valve ball 128.

Figure 5:
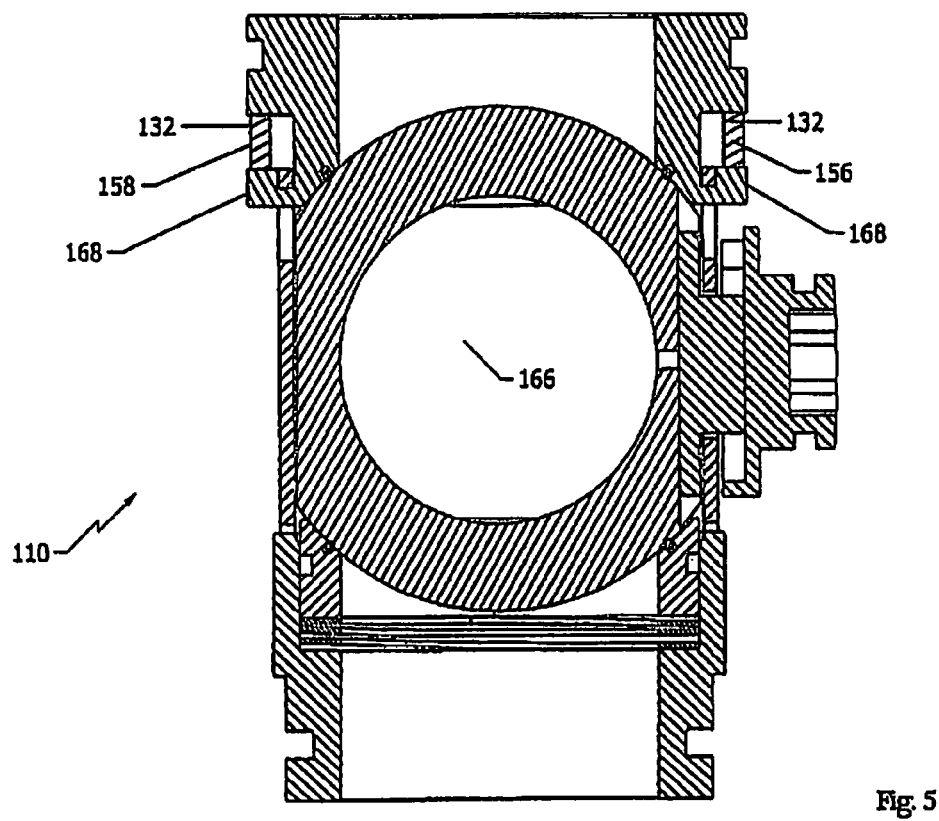
FIG. 5 is a sectional view of an embodiment described herein.
Figure 6:
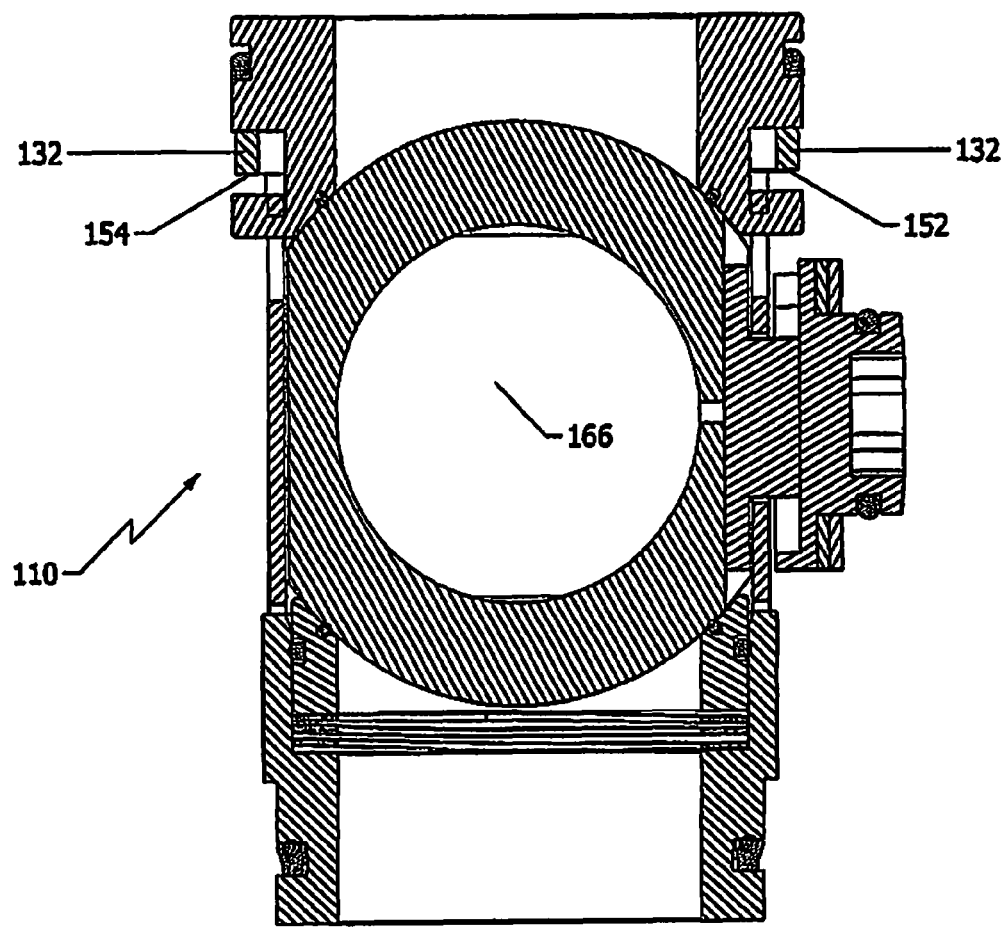
FIG. 6 is a sectional view of an embodiment described herein.

As shown in FIG. 1, in this embodiment the upper valve seat 130 includes a channel 144 around its circumference. As depicted in FIGS. 3, 5, and 6, the upper valve seat 130 includes a notch or planar section 146 and a side projection 168 extending from notch 146 with a channel or groove 148 formed in side projection 168. In this embodiment, the groove 148 is vertically extending in the sense that it extends into projection 168 in a direction of the axis along which the valve is assembled and disassembled, i.e., the line along which the parts are separated in FIG. 1. The first tongue 140 and second tongue 142 of the bracket 112 each include a lip 150 that engage notches 146, thereby connecting the bracket 112 to the upper valve seat 130.

In the illustrated embodiment, ring 132 is a split ring (as shown in FIG. 1), which can allow the ring 132 to be placed around or located about the upper valve seat 130, or removed from the upper valve seat 130. This ring 130 includes a first recessed portion 152, a second recessed portion 154, a first extended portion 156, and a second extended portion 158. In an assembled state, ring 132 sits within channel 144 and can be rotated around the upper valve seat 130 while traveling through the channel 144.

Figure 7:
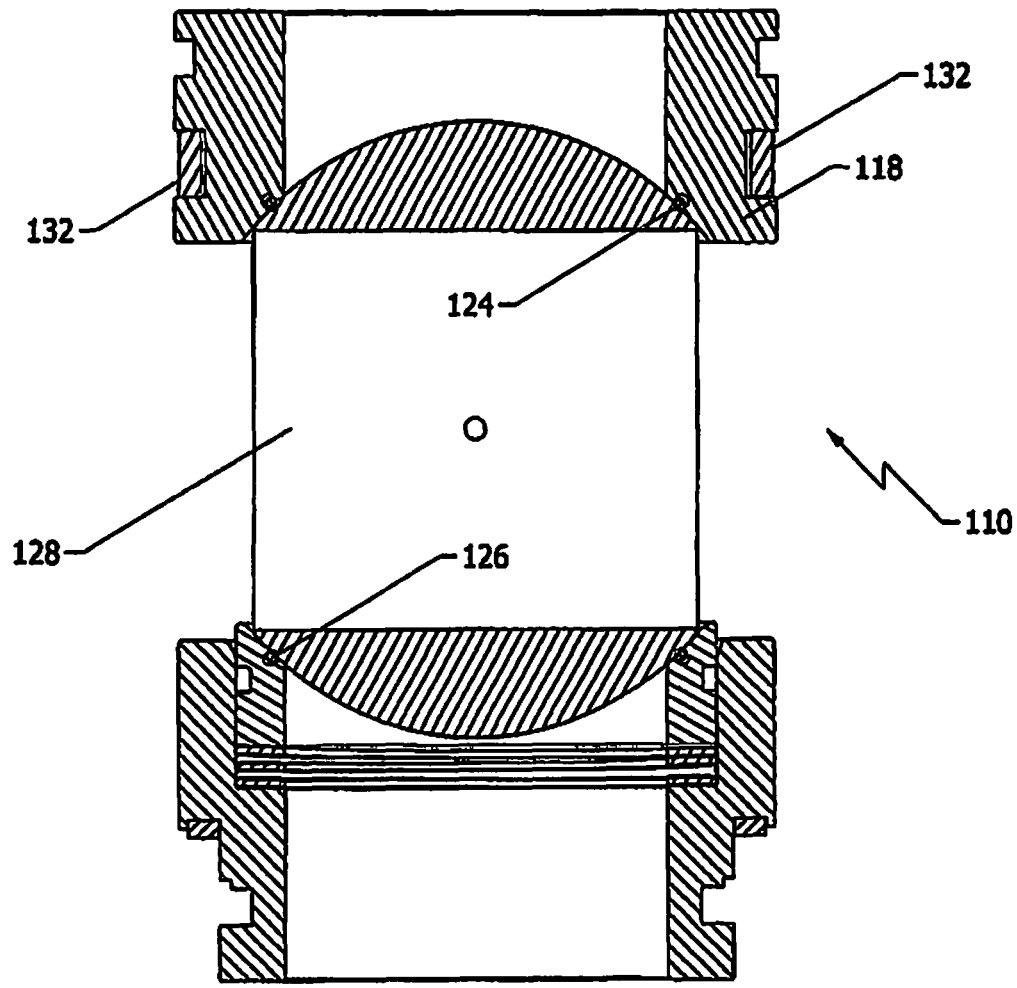
FIG. 7 is a sectional view of an embodiment described herein.

Referring to FIGS. 1, 3, 5, and 6, actuator 114 is connected to the actuator key 116 through opening 160 in the second tongue 142 of the bracket 112. The actuator key 116 includes a rib 162 that engages socket 164 of valve ball 128, thus mechanically connecting the actuator 114 with the valve ball 128. Rotation of the actuator 114 causes the valve ball 128 to rotate from a closed position (shown in FIGS. 3, 5, and 6) in which fluid is prevented from flowing through the valve mechanism 110, to an open position (not shown) in which fluid is able to flow through the valve mechanism 110 by traveling through passageway 166 of valve ball 128. FIG. 7 shows the valve mechanism of FIG. 6, but rotated 90 degrees about its vertical axis.

When the valve mechanism 110 is in an assembled state, the lower valve seat 122 and valve ball 128 are both biased toward the upper valve seat 130 by spring 120. The spring 120 sits in the lower valve seat cartridge 118 and exerts a force on the lower valve seat 122 which presses the lower valve seat 122 towards the upper valve seat 130, resulting in a compressive force between the lower valve seat 122, seals 124 and 126, valve ball 128, an upper valve seat 130. The compressive force can allow seals 124 and 126 to form a proper seal around the valve ball 128 which prevents the passage of fluids.

In operation of an embodiment, the valve mechanism 110 can be quickly and easily assembled without the use of specialized tools. For example, bracket 112, lower valve seat cartridge 118, spring 120, lower valve seat 122, seal 124, valve ball 128, and seal 126 are first seated against each other as described above. Next, first tongue 140 and second tongue 142 are flexed away from each other allowing side projections 168 of the upper valve seat 130 to pass between the lips 150 of the first tongue 140 and the second tongue 142, and allowing the upper valve seat 130 to be seated on the valve ball 128. The first tongue 140 and second tongue 142 are then flexed towards each other to engage lips 150 with notches 146. Next, the bracket 112 is moved downward such that the lips 150 additionally engage and sit within the adjacent grooves 148. The ring 132 is then located about the upper valve seat 130 and placed within channel 144. The ring 132 is next rotated around the upper valve seat 130 until the ring 132 reaches a second ring position (depicted in FIGS. 3 and 5) where the first extended portion 156 and the second extended portion 158 are substantially aligned with the respective projections 168, and in which the lips 150 of the first tongue 140 and the second tongue 142 are obstructed by, and are prevented from exiting the notches 146 by, the first extended portion 156 and the second extended portion 158, thereby securing the first tongue 140 and the second tongue 142 of the bracket 112 to the upper valve seat 130. The valve mechanism 110 can then be placed within the housing 102 and the cap 134 can be screwed onto the housing 102.

In operation of this embodiment, in order to disassemble the valve 100 and valve mechanism 110, the process described above is to a certain extent reversed. For example, the cap 134 can be unscrewed from the housing 102 and the valve mechanism 110 can be removed from the housing 102. The ring 132 is then rotated around the upper valve seat 130 until the ring 132 reaches a first ring position (depicted in FIG. 6) where the first recessed portion 152 and the second recessed portion 154 are substantially aligned with the respective projections 168, and in which the lips 150 of the first tongue 140 and the second tongue 142 are unobstructed by, and are able to exit the notches 146 by passage through, the first recessed portion 152 and the second recessed portion 154, thereby releasing the first tongue 140 and the second tongue 142 of the bracket 112 from the upper valve seat 130. If desired, the ring 132 can then be removed from the upper valve seat 130. Alternatively, the ring 132 can remain about the upper valve seat 130 located within channel 144, for example to allow for the quick and/or easy reassembly of the valve mechanism 110. Next, the bracket 112 is moved upward such that the lips 150 disengage from the grooves 148. The first tongue 140 and the second tongue 142 are then flexed away from each other to disengage lips 150 from notches 146. Next, first tongue 140 and second tongue 142 are flexed further away from each other (if necessary) allowing projections 168 of the upper valve seat 130 to pass between the lips 150 of the first tongue 140 and the second tongue 142, and allowing the upper valve seat 130 to be unseated from the valve ball 128. Bracket 112, lower valve seat cartridge 118, spring 120, lower valve seat 122, seal 124, valve ball 128, and seal 126 can then be unseated from each other. The above procedure can also allow the valve mechanism 110 to be quickly and easily disassembled without the use of specialized tools. If desired, seals 124, 126, and/or other components of the valve mechanism 110 can be repaired or replaced for example when the valve mechanism is in a disassembled or partially disassembled state. The valve 100 and valve mechanism 110 can then be reassembled for continued use.

Figure 13:
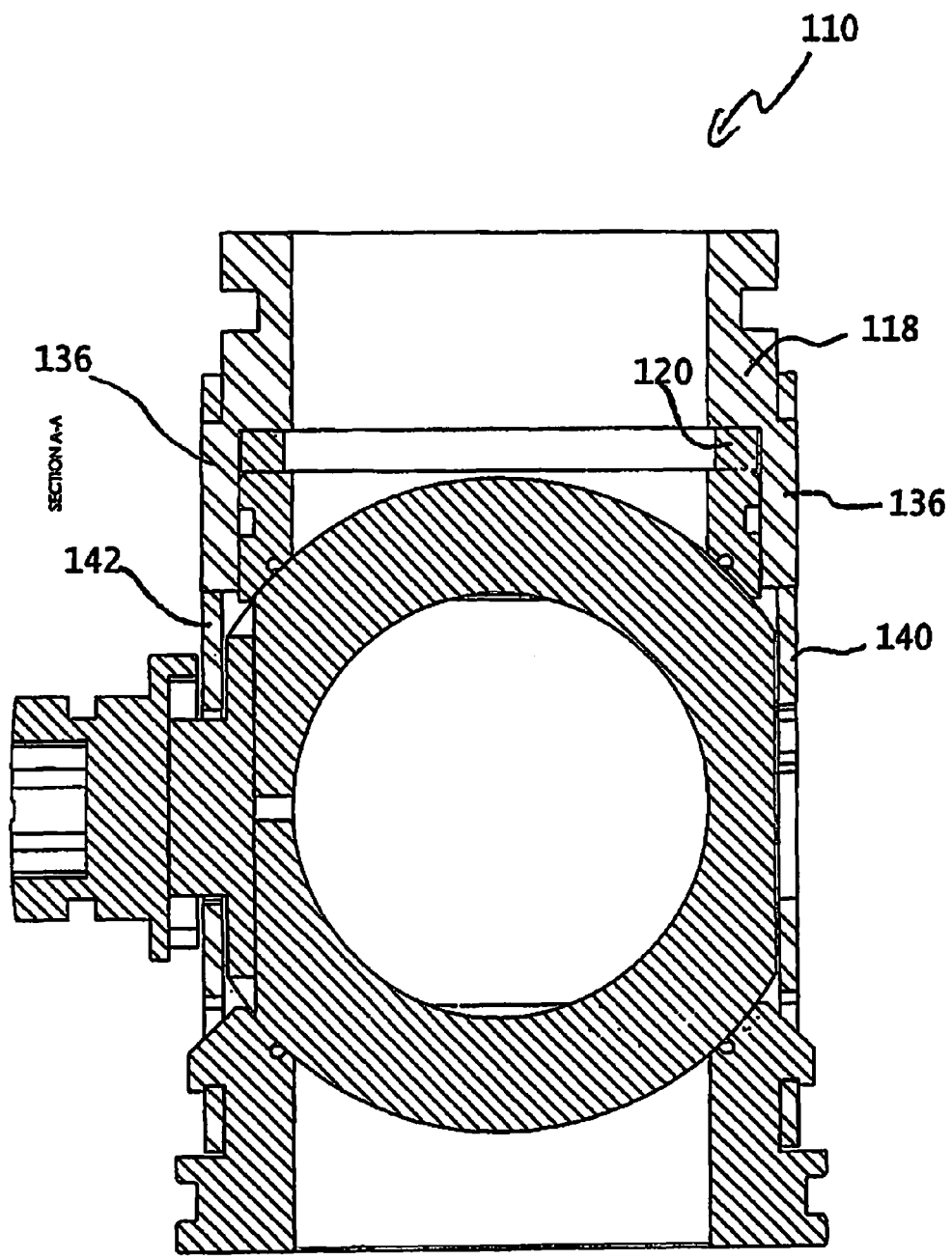
FIG. 13 is a sectional view taken along the line A-A of FIG. 12.
Figure 14:
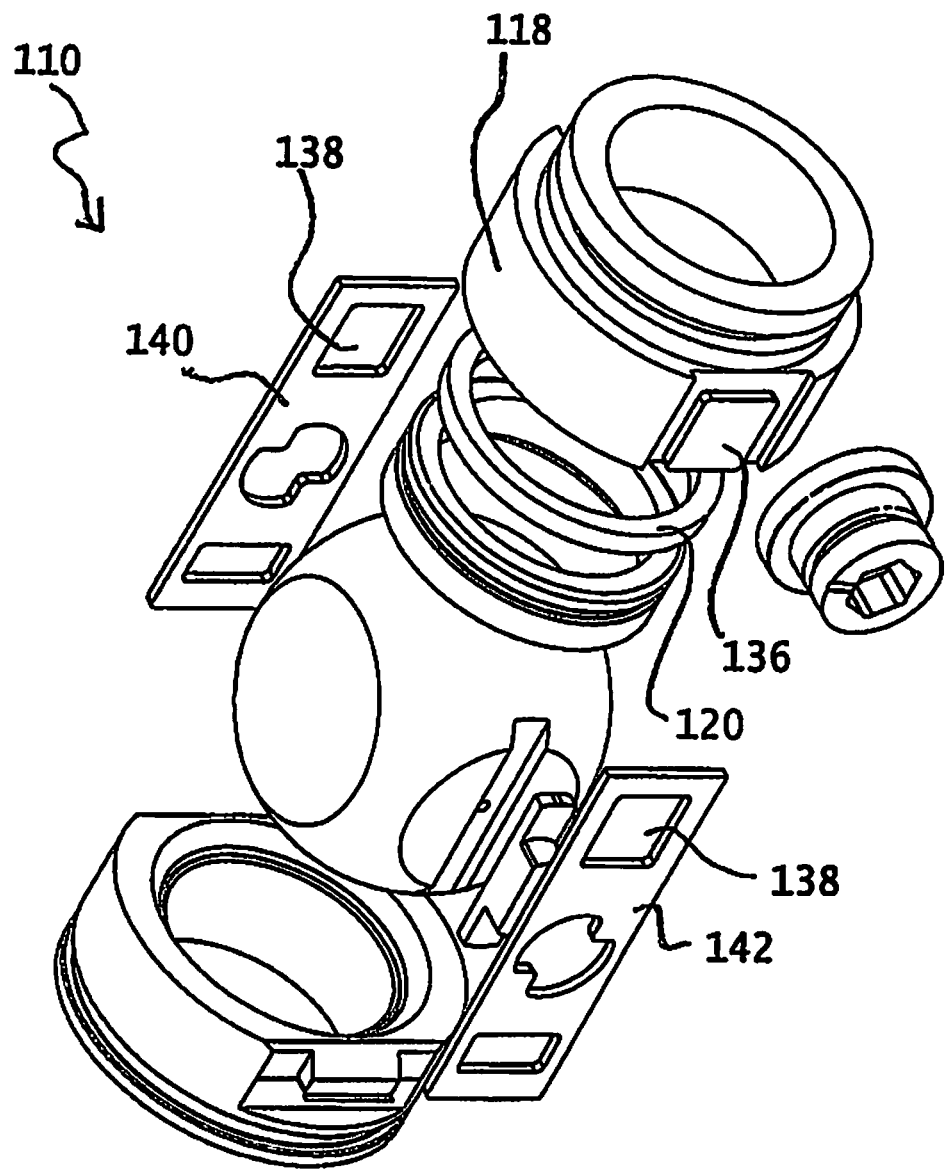
FIG. 14 is an exploded perspective view of an embodiment described herein.

Referring to FIGS. 9 to 14, an alternative embodiment of valve mechanism 110 is shown. In this embodiment, the first tongue 140 (FIG. 10) and the second tongue 142 (FIG. 9) of the bracket are separate, independently formed pieces. The protrusions 136 of the lower valve seat cartridge 118 engages the corresponding slots 138 of the first tongue 140 and the second tongue 142. The first tongue 140 and/or the second tongue 142 can be secured to the lower valve seat cartridge 118 by friction, such as friction between the outer rim of the protrusion 136 and the inner rim of the slot 138 and/or friction between the protrusion 136 and the slot 138, which is induced or increased by the biasing force of the spring 120 (FIG. 13). The first tongue 140 and/or the second tongue 142 can also be secured to the lower valve seat cartridge 118 by glue, such as a downhole epoxy, and/or a weld. Typically, the tongues 140/142 are intended to be permanently attached to the lower valve seat cartridge 118. However, there can also be embodiments where the tongues 140/142 may be secured to the lower valve seat cartridge 118 (e.g., via epoxy or a weld) in a manner that the connection of the tongues 140/142 to the lower valve seat cartridge 118 is sufficiently weak such that the tongues 140/142 can be detached from the lower valve seat cartridge 118 by hand.

Another feature of this embodiment is seen in FIG. 13. The side projection 168 includes an upwardly sloped shoulder 170. This upwardly sloped shoulder 170 is on the lower side of side projection 168, i.e., the side more proximate lower valve seat cartridge 118. Although not explicitly shown, it can be understood how, during valve assembly, sloped shoulder 170 may assist tong 142 in spreading and being seated in channel 148 of side projection 168. It may be visualized that when lip 150 is below side projection 168 in the assembly process, downward force placed on upper valve seat 130 will cause sloping shoulder 170 to engage and to spread apart lip 150. Eventually lip 150 will spread sufficiently to move past side projection 168 and snap into place within channel 148.

Figure 15A:
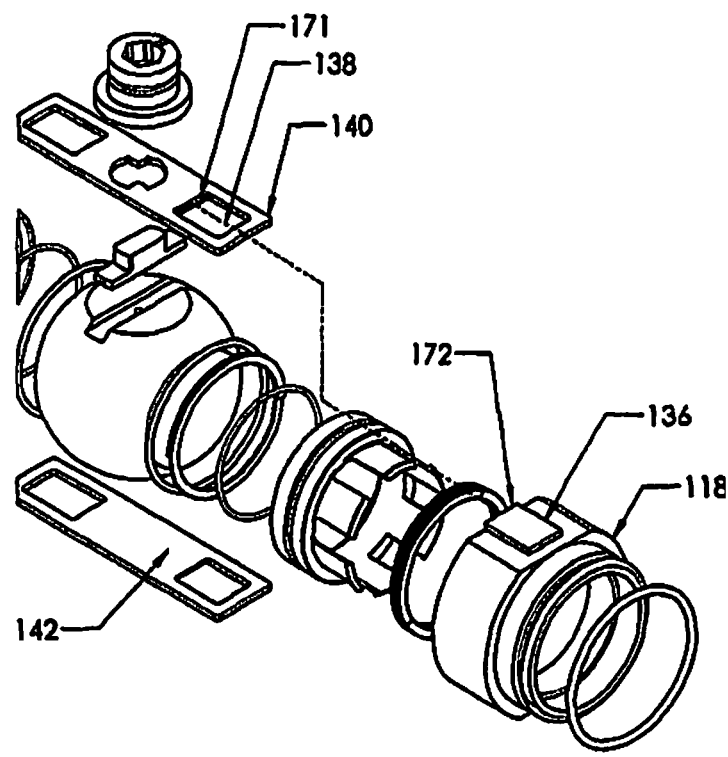
FIGS. 15A and 15B are views of an inter-locking structure for securing the tongue structures to the valve seat carriers.
Figure 15B:
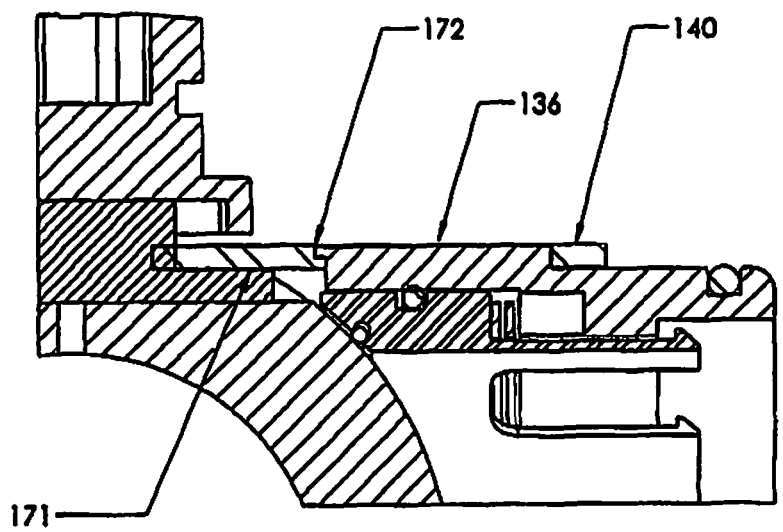

FIGS. 15A and 15B illustrate a modified version of the tongues 140 and 142 engaging valve seat cartridge 118. In this embodiment, it can be seen that the upper end of slots 138 in tongues 140 and 142 have a "lower" step 171 formed in them. A mating "upper" step 172 is formed on the top end of protrusion 136. FIG. 15B clearly illustrates how steps 171 and 172 form an inter-locking structure which acts to resist outward movement of tongues 140/142 which would otherwise tend to allow the tongues to disengage from protrusions 136. Naturally, steps 171 and 172 are merely one example of an inter-locking structure which could be formed between tongues 140/142 and protrusions 136 and any number of conventional or future developed inter-locking structures could be employed in the alternative.

Figure 16:
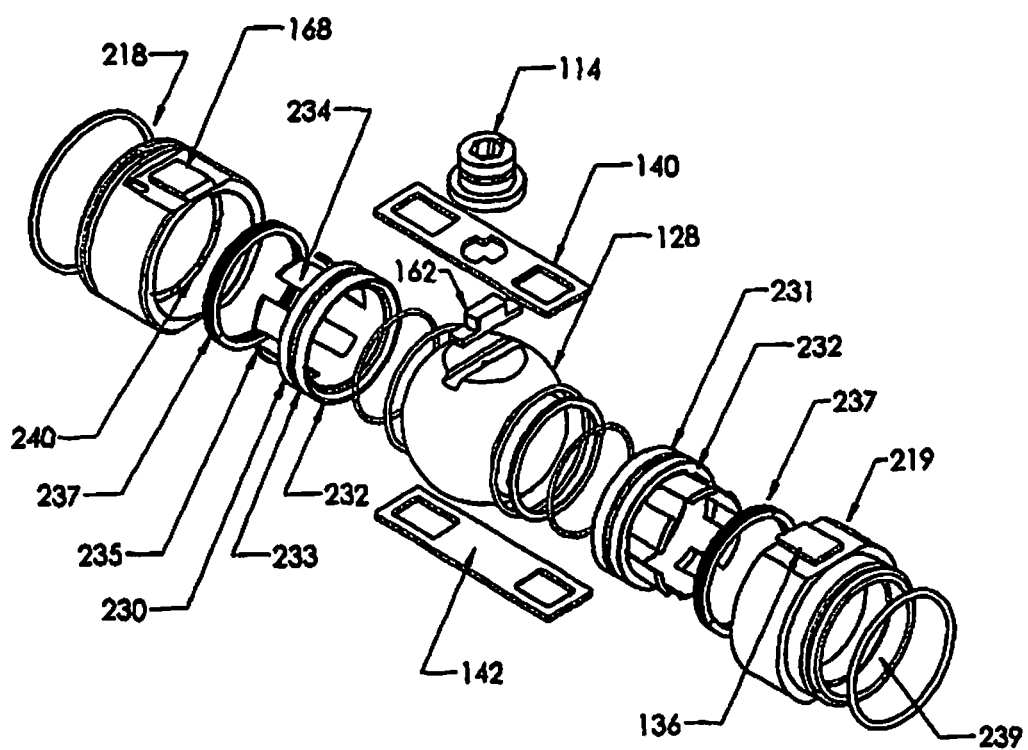
FIG. 16 is an exploded view of an alternative embodiment of a valve described herein.
Figure 17:
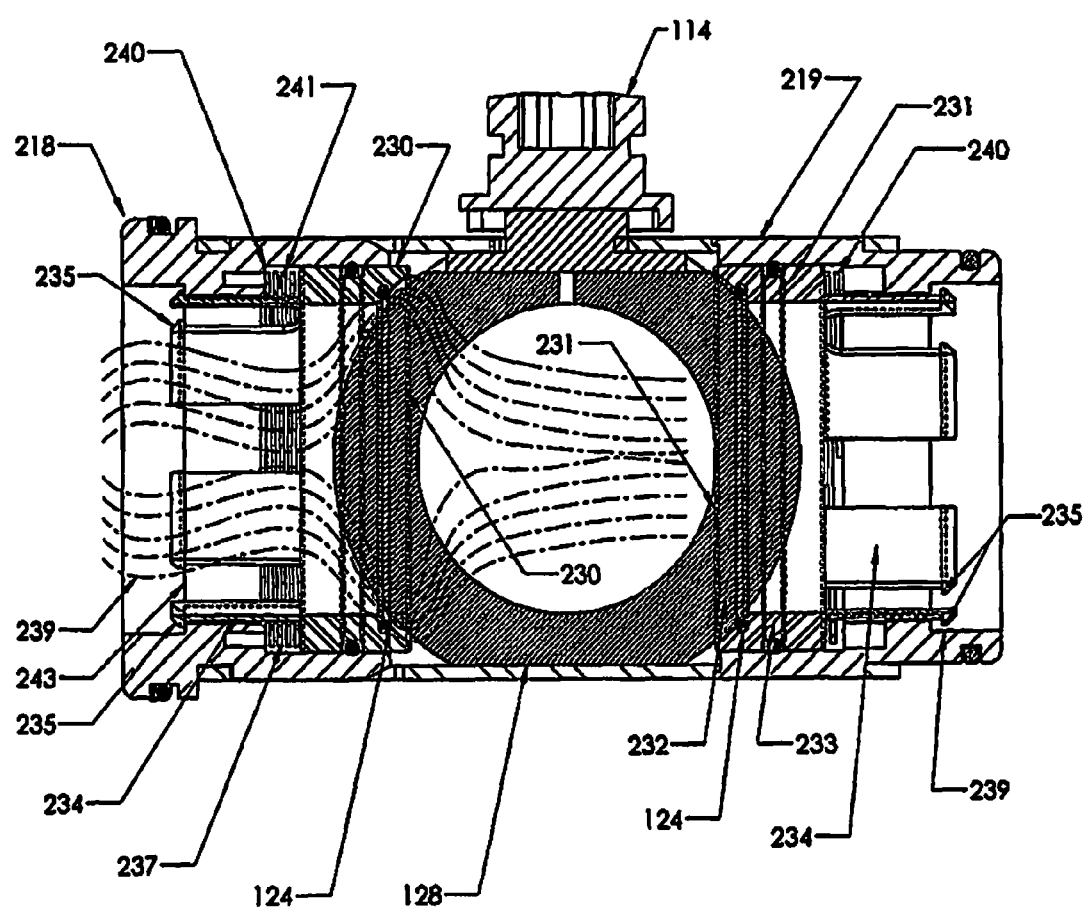
FIG. 17 is a cross-sectional view of the valve illustrated in FIG. 16.

FIGS. 16 and 17 illustrate a still further embodiment of the present invention. FIG. 16 is an exploded view of the valve which generally includes the first valve seat carrier 218, the second valve seat carrier 219, first valve seat 230 engaging valve seat carrier 218, second valve seat 231 engaging second valve seat carrier 219, and the ball valve 128 positioned between the valve seats 230 and 231. This valve is similar to previous embodiments in that the valve seat carriers are connected via tongues 140/142 engaging the projections 168 and protrusions 136 on the respective valve seat carriers. However, the particular manner of securing the relative positions of the valve seat carriers is not critical to this embodiment and the bracket 112 in FIG. 1 could be employed or any other conventional or future developed structure for securing the two valve seat carriers could likewise be employed.

Valve seats 230/231 differ from previous embodiments of the valve seats. As in earlier embodiments, the valve seats include a body 232 with a seal groove 233 (i.e., a groove for accepting a sealing member to prevent flow between the valve seats and the internal wall of the valve seat carriers), but this embodiment also includes at least one tongue section 234 extending away from the surface of the valve seat which engages valve ball 128. The tongue section 234 includes an outwardly projecting lip 235. In the FIG. 16 embodiment, valve seat 230 has three tongue sections 234, but in other embodiments, the valve seat could have more than or fewer than three tongue sections.

Figure 18:
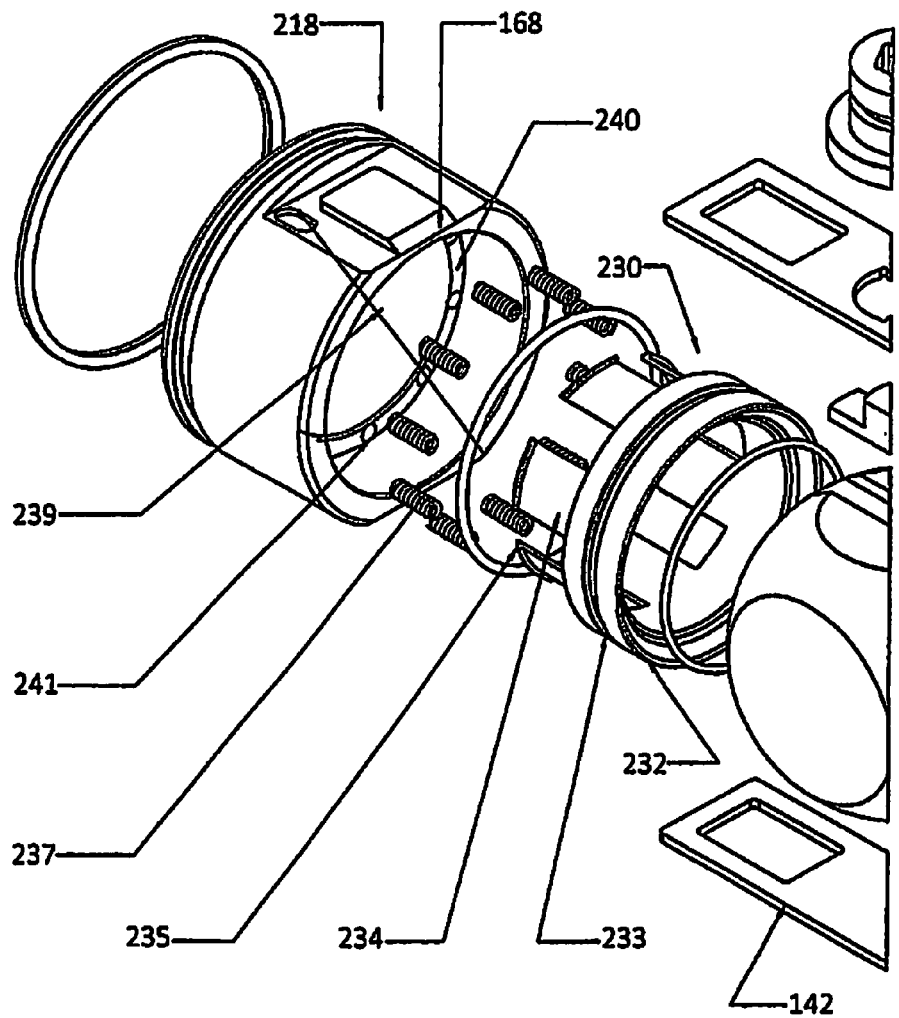
FIG. 18 is an exploded view illustrating an alternative spring arrangement.

FIG. 16 also shows how the inside surface of valve seat carriers 218 and 219 will have an inner circumferential groove 239 (seen on valve seat carrier 219 in FIG. 16). It will be understood that the tongue section 234 on valve seats 230 will flex inward to be inserted into valve seat carriers 218/219, past shoulder 240, such that the projecting lips 235 rest in circumferential groove 239. The cross-section of the assembled valve seen in FIG. 17 best illustrates how the lips 235 rest in groove 239. Shoulder 240 limits movement of valve seat 230 away from valve ball 128. It can also be seen how the springs 241 form a biasing mechanism which biases the valve seats 230/231 toward ball valve 128. However, as suggested by the position of valve seat 230, the lips 235 cannot move past the shoulder 243 of seat groove 239 and thereby limit the movement of valve seat 230 towards the valve ball. Thus, the valve seat tongue 234 and lip 235 act as a stop mechanism operating between the valve seat carriers and the valve seats and only allow limited movement between the valve seat carriers and the valve seats. The biasing mechanism shown in FIGS. 16 and 17 is a single larger coil spring 237. However, the biasing mechanism could be any conventional or future developed biasing device, for example, FIG. 18 illustrates a series of smaller coil springs 237 position in spring apertures 241 formed in valve seat shoulder 240.

If it is assumed in FIG. 17 that pressure is acting on the left side of valve ball 128, it may be visualized how this pressure will act (when the valve ball is in the "closed" position) to force valve seat 230 and valve ball 128 to the right toward valve seat 231. However, the travel of valve seat 230 is limited by the stop mechanism of lips 235 acting in groove 239, while valve ball 128 is allowed to continue moving to the right until its travel is arrested by valve seat 231 engaging valve seat shoulder 240 on valve seat carrier 219. It can be seen that in this position, valve ball 128 engages the o-ring seal 124 on valve seat 231, but valve ball 128 has moved out of sealing engagement with o-ring seal 124 on valve seat 230. Thus, this stop mechanism limits the travel of valve seat 230 towards valve ball 128 such that the valve ball may be pushed away from a sealing engagement with the valve seat 230. As one example, this travel distance is between about 0.0001 and about 0.75 inches, and most preferably about 0.1 inches, and therefore allows that degree of travel by the valve seats. However, the degree of allowable travel of the valve seats could vary considerably from this range in different embodiments.

Because the seal between valve ball 128 and valve seat 130 is not maintained, pressurized fluid may flow around valve ball 128 and equalize pressure on the left side of the ball and its hollow interior (see flow lines in FIG. 17). It will be understood that this differs from certain prior art ball valves where the valve seat could follow the valve ball and the seal would be maintained between both valve seats and the valve ball. This prior art arrangement resulted in the force of pressurized fluid acting on the left valve seat and the left valve ball surface being transmitted to the opposite valve seat and ultimately to the structure maintaining the relative position of the two valve seats (in FIG. 1, tongues 140/142).

The operation of this force over time may have undesirable effects by causing fatigue of the tongue structure and other parts of the ball valve.

Figure 19:
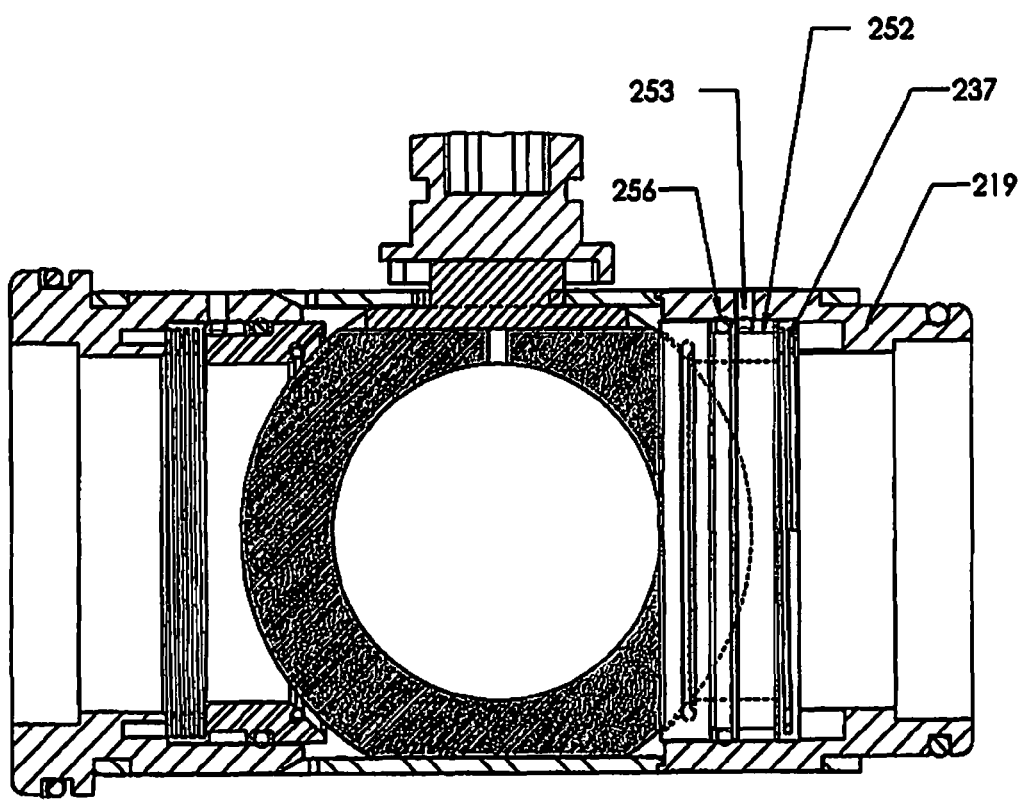
FIG. 19 is a cross-sectional view of a still further alternative embodiment of the valve described herein.
Figure 20:
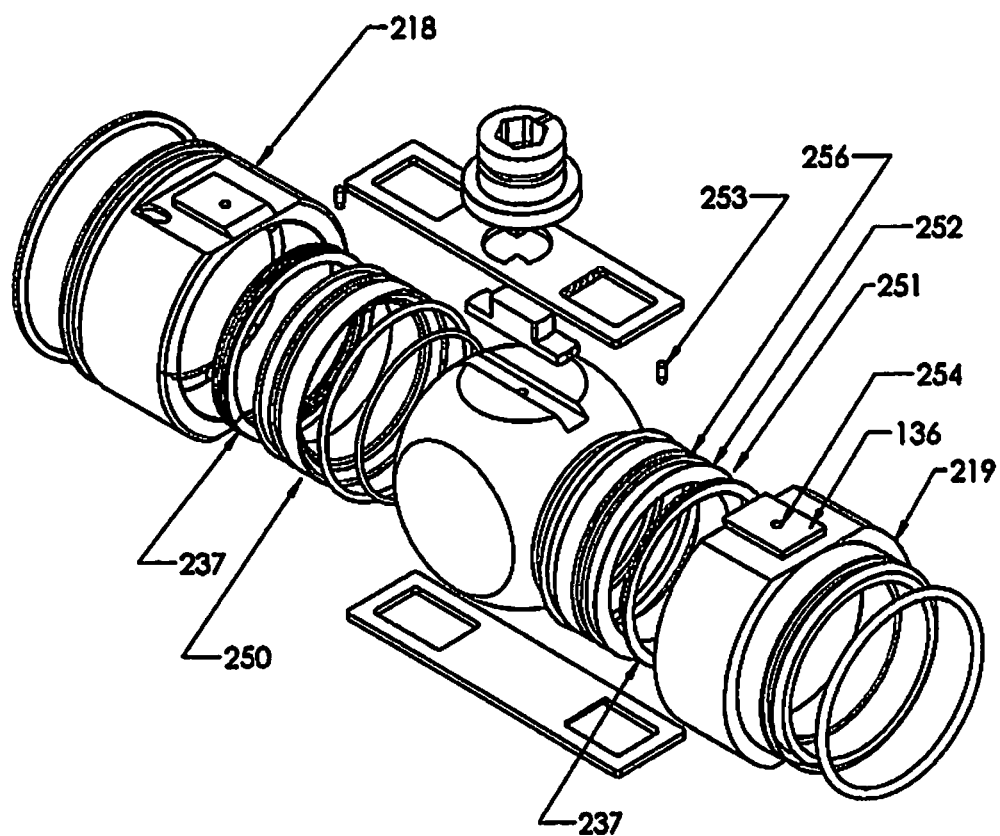
FIG. 20 is an exploded view of the embodiment seen in FIG. 19.

FIGS. 19 and 20 illustrate an alternative stop mechanism structure. FIG. 20 shows the valve seat carriers 218 and 219 with a pin aperture 254 formed through their protrusions 136 and pin groove 252 formed on the outer surface of the valve seats 250 and 251, along with the seal grooves 256. The cross-sectional view of FIG. 19 illustrates how the retaining pin 253 (or other pinning member) extends through the pin aperture 254 to engage the pin groove 252, It can be envisioned how retaining pin 253 will act limit the movement of the valve seats to the width of the pin groove 252 much like the of lips 235 acting in grooves 239 of FIGS. 15 to 18. However, FIGS. 19 and 20 may be considered as disclosing the reverse structure of FIGS. 15 to 18, i.e., FIGS. 19 and 20 show a lip (retaining pin 253) formed on the valve seat carrier and a groove formed on the valve seat. Naturally, the pinning member could be any type of rod, screw, or other structure which engages the groove 252. It will be understood that FIGS. 15 to 20 disclose merely two examples of stop mechanisms and those skilled in the art will see many different ways to implement other stop mechanisms between the valve seat carrier and the valve seat, all of which should be considered as falling within the scope of the present invention.

In FIGS. 16 to 20, the second valve seat and second valve seat carrier have substantially the same stop mechanism structure as valve seat/valve seat carrier. However, in alternate embodiments valve seat 231/valve seat carrier 219 may have a different stop mechanism structure or potentially no stop mechanism structure (e.g., valve seat 231 and valve seat carrier 219 are formed as a single unitary structure).

FIGS. 21 to 24 illustrate another embodiment of the valve assembly. FIG. 21 shows a partial exploded view of one half the complete valve assembly, including valve seat carrier 318, spring 320, valve seat 322, partial ring stop member (or partial stop ring) 334, valve ball 328, and various seals 326, 324, and 332. One manner valve seat carrier 318 differs from earlier embodiments is that it includes shelf (or lip) 340 cut into the upper surface of valve seat carrier 318. It can be seen how this shelf 340 forms a gap 341 that communicates with the interior of the valve seat carrier and an internal stop ring groove or slot (or internal groove or slot) 333 formed along the interior circumference of valve seat carrier 318. Valve seat 322 also differs from previous embodiments in that it has an external stop ring groove (or external groove) 352 on its outer circumference. The interaction of these elements is best seen in the cross-sectional view of FIG. 22 and in particular, the detailed inset of FIG. 23. FIG. 23 illustrates how partial stop ring 334 rests in ring groove 333 in valve seat carrier 318. Because partial stop ring 334 is formed of a material (e.g., spring steel) biasing the partial ring toward a more expanded state, partial stop ring 334 tends to remain in internal ring groove 333. With stop ring 334 also engaging the wider ring groove 352 in valve seat 322, it may be seen how stop ring 334 limits the movement of valve seat 322 to the width of ring groove 352. It will be apparent from FIG. 22 that as long as ball 328 can move (for example to the right in FIG. 22) a distance greater than the width of ring groove 352, then the seal 332 on ball seat 322A will be out of contact with the ball 328, thus preventing the accumulation of pressure against that side of ball 328 which tends to interfere with rotation of ball 328.

FIG. 22 also illustrates how this embodiment of valve seat carriers 318 have carrier shoulders 345. The carrier shoulders 345 are engaged by the stop legs 330 on valve seats 322.

Another groove formed around stop legs 330 creates the spring space or spring pocket 331 into which spring 320 is positioned. The interaction of carrier shoulders 345 and stop legs 330 perform at least two functions. First, when ball 328 is centered in the valve, the gap 348 between carrier shoulders 345 and stop legs 330 should be greater than the width of ring groove 352 in valve seats 322. This allows ball 328 to move sufficiently far (again to the right in FIG. 22) from valve seat 322A that seal 332 on valve seat 322A ceases to sealingly engage ball 328. Second, in the illustrated embodiment, the length of stop legs 330 will be sufficient that spring 320 is less than fully compressed when stop leg 330 does move into contact with carrier shoulder 345. This configuration prevents over-compression of spring 320, extending the life of and maintaining the spring constant of spring 320.

Figure 24:
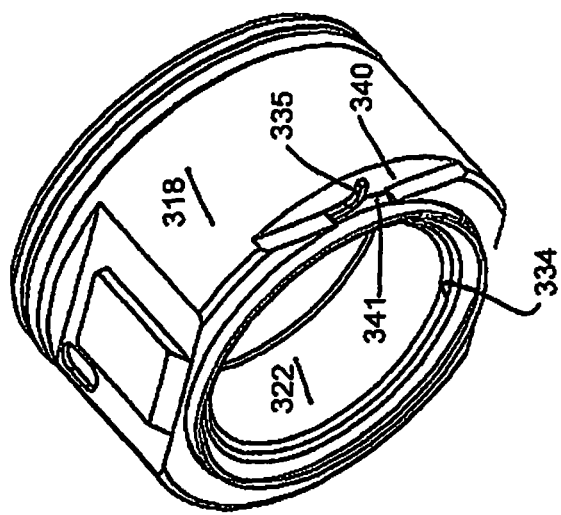
FIG. 24 is an assembled view of the components seen in FIG. 21.

FIG. 24 suggests how this embodiment provides a method of installing the partial stop ring 334 during the assembly of valve seat 322 and valve seat carrier 318. It can be envisioned from FIG. 24 how valve seat 322 would first be inserted into valve seat carrier 318 such that the external ring groove 352 on valve seat 322 aligns with the internal ring groove 333 on valve seat carrier 318. At this point, the straight end of partial stop ring 334 may be positioned in the gap 341 and guided into the passage created by the aligned ring grooves 322 and 333. By carefully rotating the valve seat/valve seat carrier assembly, partial stop ring 334 may be "threaded" into the aligned ring grooves until the partial stop ring is fully inserted and the finger extension 335 is flush with shelf 340 (as shown in FIG. 24). In a similar manner, the shelf 340 assists in removing the valve seat 322 from the valve seat carrier 318. Because finger extension 335 is exposed on shelf 340, the assembler may grasp finger extension 335 (either by hand, or more typically with a tool such as pliers) and work partial stop ring 334 out of the passage created by the aligned ring grooves 322 and 333. This allows the partial stop ring 334 to be withdrawn from the passage and valve seat 322 to be removed from valve seat carrier 318.

The embodiments shown in the drawings and described above are exemplary of numerous embodiments that may be made within the scope of the appended claims. For example, while the illustrated embodiments disclose utilizing the ring 132 to help retain the tongues 140 and 142 of bracket 112, other embodiments could completely exclude the ring 132 (e.g., FIGS. 9 to 14) and simply rely on the spring biasing lip 150 to remain in groove 148. Likewise, while protrusions 136 and side projections 168 are shown in the figures as different structures, other embodiments could utilize the same structure for protrusions 136 and side projections 168. It is also contemplated that numerous other configurations may be used, and the material of each component may be selected from numerous materials other than those specifically disclosed. In short, it is the applicant's intention that the scope of the patent issuing herefrom will be limited only by the scope of the appended claims.

I claim:
1. A valve, comprising:
 a. a first and a second valve seat carrier;
 b. a first valve seat associated with the first valve seat carrier and a second valve seat associated with the second valve seat carrier;
 c. a valve ball between the valve seats;
 d. a stop mechanism operatively connected to at least ft the first valve seat, the stop mechanism comprising a slot and a stop member acting between the first valve seat and the first valve seat carrier, the stop mechanism thereby limiting travel of the first valve seat towards the valve ball such that the valve ball is allowed to move away from a sealing engagement with the first valve seat; and e. at least one spring biasing the first valve seat toward the valve ball along an entire length of travel of the first valve seat.

2. The valve of claim 1, wherein the slot is formed on an external surface of the first valve seat and the stop member is a partial ring.

3. The valve of claim 2, further comprising a ring groove formed on an internal surface of the first seat carrier and wherein the partial ring engages the ring groove.

4. The valve of claim 3, wherein the first seat carrier has an upper surface and a shelf cut in a portion of the upper surface such that a finger extension on the partial ring rests within the shelf.

5. The valve of claim 1, wherein the stop member comprises a lip formed on the first valve seat and the slot is formed in the first valve seat carrier.

6. The valve of claim 1, wherein the stop member comprises a pinning member extending through the first valve seat carrier to engage the slot formed in the first valve seat.

7. The valve of claim 1, further comprising a second stop mechanism operatively connected to the second valve seat, the stop mechanism comprising a slot and a stop member acting between the second valve seat and the second valve seat carrier, the stop mechanism thereby limiting travel of the second valve seat towards the valve ball such that the valve ball is allowed to move away from a sealing engagement with the second valve seat.

8. The valve of claim 7, wherein at least one spring biases the second valve seat toward the valve ball.

9. The valve of claim 1, wherein the travel of the valve seats is between about 0.0001 inches and about 0.75 inches.

10. The valve of claim 1, wherein the at least one spring comprises a single coil spring positioned on a shoulder in the first valve seat carrier.

11. The valve of claim 1, further comprising a valve housing into which the valve seat carriers are inserted.

12. The valve of claim 1, further comprising seals positioned between the valve ball and the valve seats.

13. The valve of claim 12, further comprising an actuator engaging the valve ball.

14. The valve of claim 1, wherein the at least one spring comprises a series of individual coil springs positioned on a shoulder in the first valve seat carrier.

15. A ball valve comprising:
a. a first and a second valve seat carrier;
b. a first valve seat cooperating with the first valve seat carrier and a second valve seat cooperating with the second valve seat carrier;
c. a valve ball positioned between the valve seats;
d. a first stop mechanism operatively connected to the first valve seat and a second stop mechanism operatively connected to the second valve seat, the stop mechanisms comprising a slot and a stop member acting between the valve seats and the valve seat carriers, the stop mechanisms configured to limit travel of the valve seats towards the valve ball such that the valve ball is allowed to move away from a sealing engagement with the valve seats; and
e. at least one spring biasing the first valve seat toward the valve ball and at least one spring biasing the second valve seat toward the valve ball, wherein the springs maintain a biasing force on the valve seats after the valve ball moves away from sealing engagement with the valve seats.

16. The valve of claim 15, wherein the slot is formed on an external surface of the valve seats.

17. The valve of claim 15, wherein the stop members are partial rings.

18. A valve, comprising:
a. a first and a second valve seat carrier;
b. a first valve seat associated with the first valve seat carrier and a second valve seat associated with the second valve seat carrier;
c. a valve ball between the valve seats;
d. a stop mechanism operatively connected to at least a the first valve seat, the stop mechanism comprising a slot and a stop member acting between the first valve seat and the first valve seat carrier, the stop mechanism thereby limiting travel of the first valve seat towards the valve ball such that the valve ball is allowed to move away from a sealing engagement with the first valve seat; and
e. wherein at least one biasing mechanism associated with each valve seat biases the valve seats toward the valve ball, both at a time when the first or second valve seat engages the valve ball and at a time when the valve ball has moved out of engagement with the first or second valve seat.

* * * * *